R. Daniels,
Anti-Friction Roller.
Nº 23,664.        Patented Apr. 19, 1859.
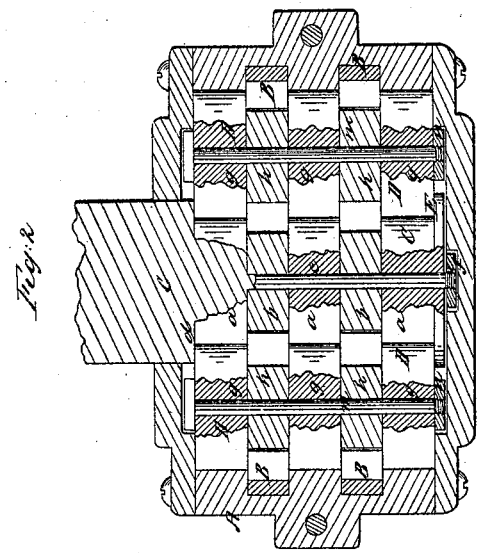
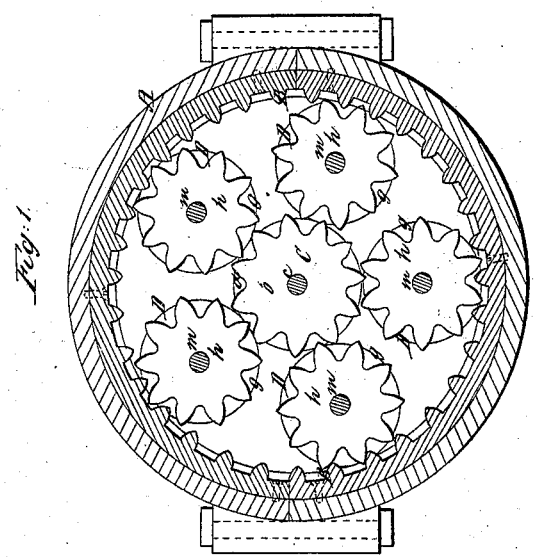
Witnesses
S. Mowray
Chandler Richards
Inventor
Ruenza Daniels

UNITED STATES PATENT OFFICE.

RIENZA DANIELS, OF ALMENA, MICHIGAN.

JOURNAL-BOX.

Specification of Letters Patent No. 23,664, dated April 19, 1859.

*To all whom it may concern:*

Be it known that I, RIENZA DANIELS, of Almena, in the county of Van Buren and State of Michigan, have invented a new and useful Improvement in Journal-Boxes; and I do hereby declare that the following is a full, clear, and exact description of the same, reference being had to the accompanying drawings, forming a part of this specification, in which—

Figure 1, is a vertical transverse section of a journal box constructed after my invention. Fig. 2, is a horizontal section of the same.

Similar letters of reference, in each of the several figures indicate corresponding parts.

My invention relates to an improvement in that description of journal box which employs a series of friction rollers with cog teeth on their periphery to form anti-friction bearings for the journals of the axle to run upon.

The nature of my invention consists in constructing each of the friction rollers of a series of ring sections, and uniting said sections together so that they lie in the same line, by means of a screw rod and nut, and in combination with this mode of constructing the friction roller it consists in constructing each of the journals of the axle of a series of similar ring sections and uniting the same together, so that they lie in the same line, by means of a screw tapped arm and shoulder of the axle, as hereinafter described. By thus constructing the friction rollers of the box and the journals of the axle I am enabled to have the rollers gear with two circles of cog teeth on the inner circumference of the box, instead of with only one, as usual. I am also enabled to have the roots of the teeth of the rollers and of the journal extend down beyond the circumference of the rollers and journal, and thus cause the rollers, journal box and journal to gear together in such a manner as to prevent lateral play of the rollers in the box.

The first advantage results from being able to cast the sections separately and then disposing them as the necessity of the case may require, instead of being subjected to the difficulties attending the drawing from the sand or mold a roller having two circles of teeth on its circumference, and the second advantage results from being able to cast the cogged sections of larger diameter than the plain or smooth sections and with deep teeth, instead of, as usual, when the whole roller is cast in one piece, owing to the difficulty attending the drawing of the roller from the sand or mold, being compelled to cast all the rings of the same diameter and to have the root of the teeth strike out just from the surface of the circumference of the roller.

To enable others, skilled in the art, to make and use my invention, I will proceed to describe its construction and operation.

A, represents the journal box of ordinary construction, generally. B, B, are two circles of cog teeth formed on its inner circumference. This box is cast in segments in order that it may be readily drawn when two lines of teeth are formed on it. The roots of the teeth on this box extend down beyond the circumference of the box and consequently lateral stops are formed on opposite sides of each space existing between the teeth.

C, is the axle and D, D, D, D, D, friction rollers interposed between the axle and inner circumference of the journal box.

The journals C′ of the axle C are formed of a series of toothed and plain ring sections $a, a, a, b, b$. These sections are fitted over an arm $c$, of the axle, and confined together by means of a shoulder $d$, on the axle and a screw and nut; the screw $e$, being formed on the end of the arm $c$, and the nut $f$, being screwed on the same until the sections lay close together and nearly touch the shoulder $d$. It will be noticed that the sections are so disposed on the arm that the cogged sections $b, b$, come opposite the circles of cogs formed on the inner circumference of the box.

The friction rollers (1), (1), (1), (1), (1), are formed in sections $g, g, g, h, h$, in just the same manner as the journals of the axle and the sections are fastened together by screw rods $m$, and nuts $n$, as shown.

E, is a washer for presenting lateral play of the friction rollers; lateral plan is further and almost wholly avoided by having the ends of the teeth of the rollers extend into the spaces existing between the teeth of the journal and the teeth of the box, some distance, as illustrated in the drawings. The teeth of the friction rollers by extending into the spaces below the circumference of the plain portions of the axle journal, and beyond the plain portions of the inner circumference of the box being made to act in concert with the sides of the spaces as lateral stops to the rollers in a manner to keep them steady and in place.

What I claim as my invention and desire to secure by Letters Patent, is—

The axle $c$, $d$, furnished with a screw trapped arm $c$ and having toothed and plain sections $a$, $a$, $a$, E, $b$, $b$, of a journal arranged and clamped upon it in combination with the internally toothed journal box A, B, B, and with rods $m$, $m$, toothed and plain sections of friction rollers D, D, arranged and clamped on them all in the manner described and for the purpose set forth.

The above specification of my improvement in journal boxes signed by me this thirtieth day of October 1858.

RIENZA DANIELS.

Witnesses:
JOEL T. ZIELIE,
ASHEL S. DOWNING.